April 8, 1941.　　　M. W. RUDD　　　2,237,793
SPONGE

Filed June 17, 1939

INVENTOR
*M. W. Rudd*

BY
ATTORNEY

Patented Apr. 8, 1941

2,237,793

UNITED STATES PATENT OFFICE 2,237,793

SPONGE

Martin W. Rudd, Fresno, Calif.

Application June 17, 1939, Serial No. 279,685

1 Claim. (Cl. 15—130)

This invention relates to a sponge of general utility for washing purposes, and in particular to one designed for use in connection with the washing of automobiles.

The principal object of the invention is to provide a fountain sponge adapted for removable attachment with an ordinary garden hose; the device being arranged so that an effective washing and flushing of a surface is obtained as the sponge is wiped thereover.

Another object of the invention is to provide a fountain sponge having a unique water distributing member formed therein; the sponge—by reason of said member—having a flow of water distributed throughout its entire body area, such flow not only assuring proper washing but making the sponge self-flushing or cleaning.

It is also an object of the invention to provide a fountain sponge, of the type described, arranged so that when in use no abrupt, sharp, or rigid parts can contact or damage the surface being washed; the sponge being quite resilient throughout its exterior surface.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
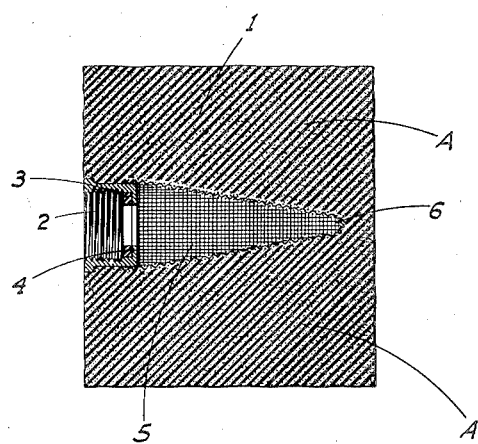
Figure 1 is a sectional elevation of one form of the invention.

Referring now more particularly to the characters of reference on the drawing, and particularly at present to the form of the invention shown in Fig. 1, the numeral 1 indicates a sponge rubber body which as here shown is cylindrical and of substantial diameter.

The female member of a hose coupling, indicated at 2, and including the usual hose washer 3 supported on an annular seat 4, is inset into the sponge rubber body 1 axially thereof and from one end. This coupling member may be secured with the surrounding sponge rubber in any suitable manner, and the outer edge of said coupling member is preferably disposed flush with the end surface of the body.

A tubular water distributing passage element 5 formed of relatively fine but open mesh screen or wire fabric is mounted on and in communication with the inner end of coupling member 2 and projects axially into the sponge rubber body 1; said passage element tapering to a blunt end 6 which is disposed adjacent but short of the opposite end of the body from the end into which the coupling member is inset. The passage element 5 is closely surrounded and engaged by the adjacent sponge rubber of the body.

In use, the above described device is attached on the end of a garden hose in the obvious manner and as water flows into the tapered distributing element, it is discharged evenly into the whole of the sponge rubber body and feeds through the interstices of said body to the outer surfaces thereof. With the water flowing from the body, said body is grasped in one hand and wiped over the surface to be washed. The configuration of the body is such that it can be grasped in any position, and any portion thereof can engage the surface to be washed and with a substantial area of contact as is desirable. As the water is well distributed throughout the sponge, any such portion of the body is effective for washing operations; the flowing water not only flushing dirt away from the surfaces engaged with the body but also acting to flush and clean such sponge rubber body.

By forming the water distributing element with a taper and blunt point as described, there is a minimum reduction of the resiliency and effectiveness in the area A of the sponge surrounding the end portion of said element, and which area is of course that whose exterior surface will be most frequently engaged with the surface to be washed. Also such arrangement gives a greater thickness in such area for wear, and the blunt end 6 prevents such end from cutting through to the adjacent end of the body and damaging the object being washed.

If the user does not desire a substantial flow of water from the side of the body grasped by the hand, a proper grip will close many of the water channels in the body on such side and thus restrict the flow thereto.

The device functions effectively and with ease, does not damage the paint or finish on an automobile body or other object being washed.

Figure 2:
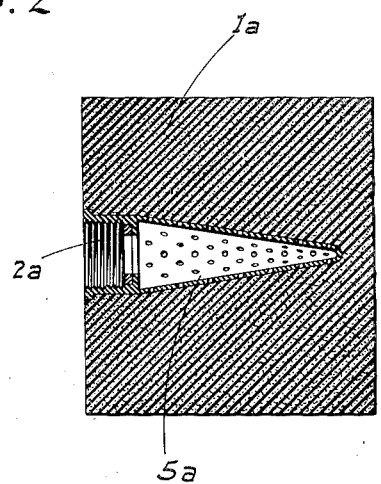
Figure 2 is a sectional elevation of a modified form of the invention.

The modification of the invention shown in Fig. 2, functions in the same manner as above and comprises a similar sponge rubber body 1a, a coupling member 2a, and a tubular and tapered water distributing passage element 5a; the difference in structure residing in the fact that the coupling member 2a and element 5a are integral and formed of rubber. As the element 5a is resilient, it can flex when the device is in use, thus further reducing the likelihood of damage to the object to be washed. Another advantage of this form of the device is that the sponge body as well as the coupling member 2a being of rubber, the two may be firmly vulcanized together without any additional securing means being necessary to hold the coupling member in place.

Also of course the member 5a is not of screening, but is freely perforated as shown to give the same result.

While a cylindrical sponge rubber body is shown and described in both modifications of the invention, cellulose and other types of sponges may be used, and the shape may vary also.

It may here be noted that while the use of a water distributing element within the sponge gives the best results, such element can be omitted, and the sponge will still function satisfactorily as long as the water entering the sponge from the hose coupling can penetrate through the interior of the sponge to the surface thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a fountain sponge including a sponge body, a tapering water distributing passage member embedded in the body, and a hose coupling member connected with said member at the large end and opening out of the body; said member being of wire fabric of fine but open mesh whereby to fully diffuse the water flowing therethrough into the sponge body.

MARTIN W. RUDD.